United States Patent
Tanioka et al.

[11] Patent Number: 6,129,648
[45] Date of Patent: Oct. 10, 2000

[54] PLANETARY GEAR DEVICE

[75] Inventors: Yoshihiro Tanioka; Norio Shirokoshi; Hiroshi Nakagawa; Hiroshi Kameda; Harushige Aoyagi, all of Nagano-ken, Japan

[73] Assignee: Harmonic Drive Systems, Inc., Tokyo, Japan

[21] Appl. No.: 09/341,645

[22] PCT Filed: Nov. 19, 1997

[86] PCT No.: PCT/JP97/04223

§ 371 Date: Aug. 30, 1999

§ 102(e) Date: Aug. 30, 1999

[87] PCT Pub. No.: WO99/25992

PCT Pub. Date: May 27, 1999

[51] Int. Cl.[7] .................................................. F16H 1/28
[52] U.S. Cl. ........................ 475/331; 475/338; 475/342
[58] Field of Search ................................... 475/331, 337, 475/338, 339, 342

[56] References Cited

U.S. PATENT DOCUMENTS

| | | | |
|---|---|---|---|
| 4,304,152 | 12/1981 | Michling | 475/331 |
| 4,926,715 | 5/1990 | Hirt et al. | 475/337 |
| 5,062,824 | 11/1991 | Prokopius | 475/342 |
| 5,295,925 | 3/1994 | Hirabayashi | 475/331 |

FOREIGN PATENT DOCUMENTS

| | | |
|---|---|---|
| 52-156876 | 11/1977 | Japan . |
| 62-50690 | 10/1987 | Japan . |
| 1-153840 | 6/1989 | Japan . |
| 2-91236 | 7/1990 | Japan . |
| 3-11129 | 2/1991 | Japan . |
| 4-31322 | 3/1992 | Japan . |
| 5-45297 | 6/1993 | Japan . |

*Primary Examiner*—Khoi Q. Ta
*Attorney, Agent, or Firm*—Burns, Doane, Swecker & Mathis, L.L.P.

[57] ABSTRACT

A planetary gear device (20) comprises a front-stage side planetary gear mechanism (21) and a rear-stage side planetary gear mechanism (23). The rear-stage side planetary gear mechanism (23) comprises an internal gear (25), a carrier (29) rotatably supported by a pair of main guide bearings (26,27) disposed on both sides of the internal gear (25), a plurality of planetary gears (31) rotatably supported on a plurality of planetary shafts (30) extending between a pair of carrier parts (28A,28B) of the carrier (29), a sun gear (33) formed on an outer circumferential surface of a pinion shaft extending in a direction of a device axial line (20a) to pass through the carrier (29), and an output shaft (34) connected to the carrier (29) and extending in the direction of the device axial line (20a). The carrier (29) and the output shaft (34) are formed as a unitary member, and a pin so driven as to extend between the portions (28A,28B) of the carrier (29) fabricated as the unitary member is used as the planetary shaft (30). Therefore, the planetary gear device (20) has a reduced number of components, can be produced easily and has high assembly accuracy.

11 Claims, 6 Drawing Sheets section

PLANETARY GEAR DEVICE

TECHNICAL FIELD

This invention relates to a planetary gear device, and particularly to a planetary gear device which is advantageous in reducing the number of component members, manufacturing cost, and assembly processes thereof.

BACKGROUND OF ART

As a planetary gear device, there has been proposed a two-stage planetary gear reduction device as shown in FIG. 6. The two-stage planetary gear reduction device 1 has a front-stage planetary gear mechanism 2 and a rear-stage planetary gear mechanism 3. The rear-stage planetary gear mechanism 3 has a circular internal gear 5, first and second carriers 8 and 9 which are rotatably supported by a pair of main bearings 6 and 7 disposed on both sides of internal teeth 4 on an inner circumferential surface of the internal gear 5, a plurality of planetary gears 11 engaged with the internal teeth 4 which are rotatably supported on a plurality of planetary shafts 10 extending between the first and second carriers 8,9 a sun gear 13 engaged with the planetary gears 11 which are formed on the outer circumference of a pinion shaft 12 extending through the carriers 8, 9 in a device axial line direction 1a, and an output shaft 14 connected to the second carrier 9 and extending in the device axial line direction 1a.

The front-stage planetary gear mechanism 2 has an internal teeth 15 formed on an inner circumferential surface of the first carrier 8 at the rear side, a plurality of planetary gears 16 engaged with the internal teeth 15, a carrier 17 rotatably supporting the planetary gears 16, and a sun gear 19 which is formed on the outer circumference of a pinion shaft 18 extending along the device axial line direction 1a and is engaged with the planetary gears 16. The carrier 17 is connected to the pinion shaft 12 at the rear side.

The planetary gear device as constituted above has the following problems that must be solved.

(1) In the rear-stage planetary gear mechanism 3, the first and second carriers 8 and 9 must be fastened with each other while the planetary gears 11 is held between them, and the output shaft 14 must also be fastened. With this structure wherein separate members are fastened, there are such problems that the manufacturing cost and assembly processes are increased, and assembly accuracy is degraded, as well as the number of component parts is large.

(2) The pinion shaft 12 whose one end is connected to the carrier 17 at the front-stage side is rotatably supported at an outer circumferential surface portion of its axial end on an inner circumferential surface of the second carrier 9 via the main bearing. If the bearing portion of the pinion shaft 12 is made simplified in structure, it is advantageous in terms of its structure and manufacturing cost.

(3) A bearing nut, shim, spring and other members are used to apply a pre-pressure to bearings such as the main bearings 6, 7 disposed to rotatably support the carriers 8, 9 on the inner circumferential surface of the internal gear 5. It is, however, that the bearing nut is expensive, the shim must be adjusted of its thickness, and the spring cannot be used where a sufficient space for its installation is not assured. Thus, it is desirable as the bearing pre-pressure mechanism that the manufacturing cost is low, workability is good, and it can be assembled in a narrow space.

(4) It the main bearings 6 and 7 disposed to rotatably support the carriers 8, 9 on the inner circumferential surface of the internal gear 5 cannot be pre-pressured appropriately, when a bending moment is applied on the output shaft 14 and other portions as an external load, the span of bearing point of application between these main bearings becomes short, which gives rise to a fear that a large stress occurs.

(5) In the front-stage planetary gear device 2, the planetary shaft 16a is mounted on the carrier 17 in a cantilevered condition, on which the planetary gear 16 is rotatably supported. In this case, a snap ring 16b is fixed on the end of the planetary shaft 16a to prevent the planetary gear 16 from removing therefrom. However, when the snap ring is used as a removal prevention mechanism, the end of the planetary shaft 16a must be worked to form a groove for the snap ring. There is also a possibility that the snap ring is attached in an imperfect manner.

(6) The internal gear 5 is integrally formed on the device housing 5a. Such a structure is also known that the internal gear is manufactured separate from the device housing due to design and other aspects, and is assembled to the device housing, wherein fastening metallic parts such as a fastening screw are used to fasten the internal gear. This fastening method, however, requires time for tapping and increases manufacturing cost.

(7) The planetary gear device is sometimes used as a gear head for a motor. For this reason, the planetary gear device is provided on its end surface with an adapter flange for use in motor mounting. The adapter flange is usually mounted to the side of the reduction device with fastening screws. If other component parts of the reduction device can be fastened with making use of the fixing force by the fastening screws, the structure of the reduction device can be simplified, the number of component parts can be reduced, and the manufacturing cost can be decreased.

(8) As the planetary gear 10 or 16 rotates, the end surface thereof slides on the end surface of the carrier 8 or 9. In order to reduce sliding resistance between these parts, insertion of a washer or other means is adopted. However, attachment of such additional members causes to increase the number of component parts, and to make the assembly operation complicated since such members must be assembled.

An object of this invention is to provide a planetary gear device which is able to solve the above-mentioned problems.

DISCLOSURE OF THE INVENTION

In order to solve the above item 1, according to this invention, there is provided a planetary gear device which has an internal gear, a pair of main guide bearings disposed on both sides of the internal gear, first and second carriers rotatably supported by the main guide bearings, a plurality of planetary shafts extending between the first and second carriers, a plurality of planetary gears rotatably supported on the respective planetary gears and engaged with the internal gear, a pinion shaft passing through the first carrier coaxially to extend in a device axial line direction, a sun gear formed on an outer circumferential surface of the pinion shaft and engaged with the planetary gears, and an output shaft connected to the second carrier and extending in the device axial line direction, characterized in that the first and second carriers, and the output shaft are formed as a unitary member.

Further, the respective planetary shafts are characterized in that they are driving pins driven so as to extend between the first and second carrier portions as the unitary member.

In order to solve the above item 2, the planetary gear device according to this invention further comprises a front-stage side carrier of a front-stage side planetary gear mechanism coaxially fixed to the pinion shaft coaxially, and a supporting means for supporting a center portion of at least one axial end surface of the pinion shaft in a sliding contact state. As the supporting means, such a constitution can be adopted that has a ball member disposed adjacent in the device axial direction to the axial end surface of the pinion shaft.

In order to solve the above item 3, the planetary gear device according to this invention further comprises a bearing pre-pressure means which apply at least one of inner and outer rings of the main bearing with a pre-pressure along the device axial line direction. The bearing pre-pressure means is constituted to have a snap ring formed on its circular end surface with a circular inclined surface portion, and a snap-ring groove which has a circular inclined surface corresponding to said circular inclined surface portion and formed where a circular end surface of at least one of inner and outer rings of the main guide bearing is faced. The snap ring is inserted and fixed into the snap-ring groove, whereby the main guide bearing is applied with the pre-pressure.

In order to solve the above item 4, the planetary gear device according to this invention is characterized in that outer rings of a pair of the main bearings are applied with a pre-pressure acting along a direction to separate the outer rings from each other, while inner rings of the main guide bearings are applied with a pre-pressure acting along a direction to make the inner rings come close to each other.

In order to solve the above item 5, according to this invention, a planetary gear device constituted to have a front-stage side planetary gear mechanism in which front-stage side planetary gears are rotatably supported on fronts-stage side planetary shafts attached on a front-stage side carrier in a cantilevered condition, characterized in that a removal prevention ring-like member is press fitted on the end of the front-stage side planetary shafts so as to form tight-fitting bond.

In order to solve the above item 6, according to this invention, a planetary gear device having a device housing and an internal gear fixed on the device housing, characterized in that tightly fitted knock pins or spring pins are used to fix the internal gear to the device housing.

In order to solve the above item 7, according to this invention, a planetary gear device having an adapter flange for motor installation fixedly mounted on one end surface thereof, characterized in that the adapter flange has a projection capable of pressing and fixing the internal gear on the device housing along a device axial line direction, and that the internal gear is fixed on the device housing by the projection with a pressing force which is exerted by a fixing force to fasten the adapter flange on the device housing.

In order to solve the above item 8, a planetary gear device according to this invention is characterized in that, between a circular end surface and an end surface at the side of the first or second carrier on which the circular end surface slide, it is provided a bearing surface formed by raising one end surface toward the other side.

BEST MODE FOR CARRYING OUT THE INVENTION

In the following, a two-stage planetary gear device according to this invention will be explained.

Overall structure

Figure 1:
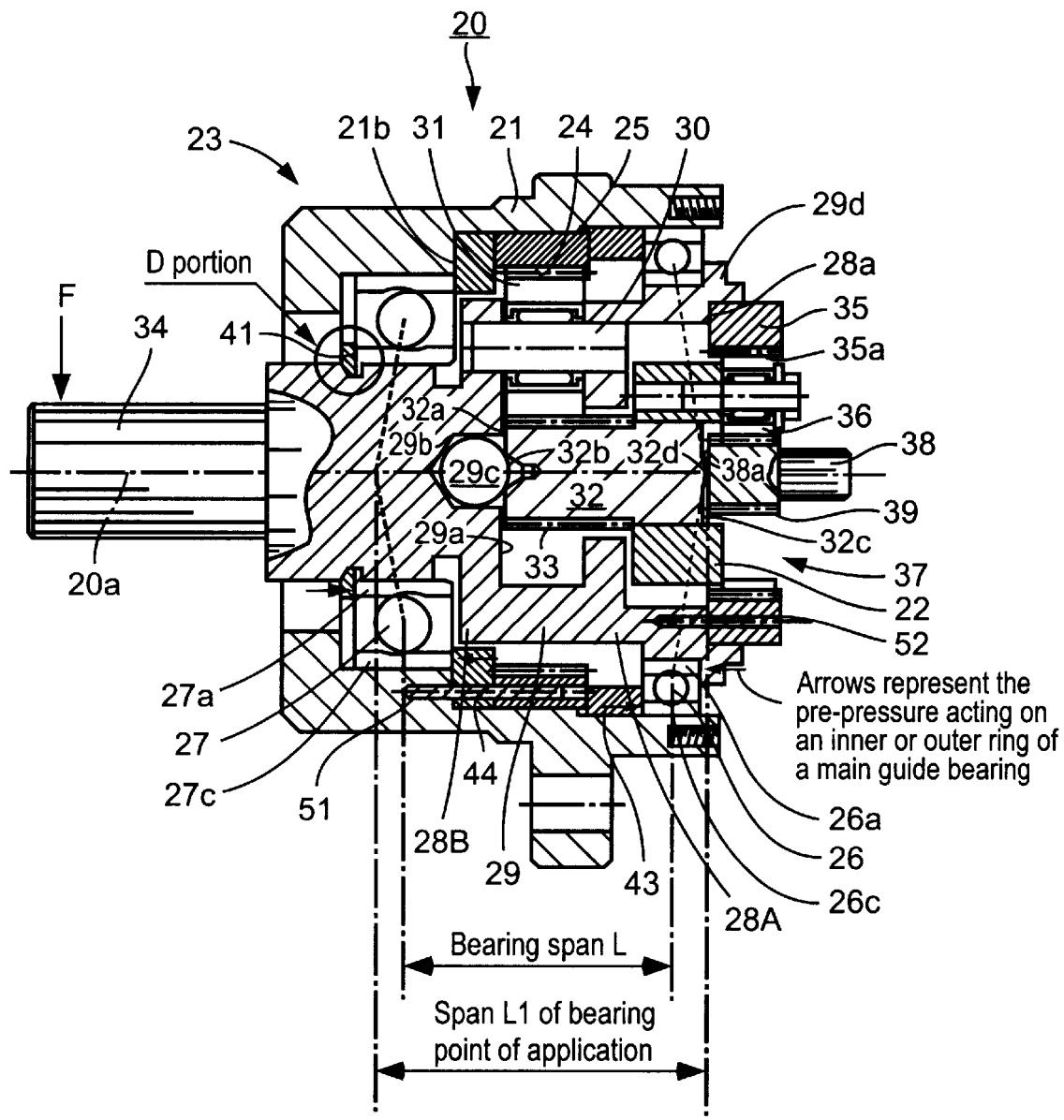
FIG. 1 is a schematic sectional diagram of a two-stage planetary gear device according to this invention.

FIG. 1 shows a structure of a two-stage planetary gear device 20. As shown in the figure, the two-stage planetary gear device 20 is constituted to have a device housing 21 in which a front-stage planetary gear mechanism 22 and a rear-stage planetary gear mechanism 23 are assembled.

The rear-stage planetary gear mechanism 23 has a circular internal gear 25 formed on its inner circumferential surface with internal teeth 24, a carrier 29 having first and second carrier parts 28A and 28B rotatably supported by a pair of main guide bearings 26 and 27 disposed on both sides of the internal teeth 24, a plurality of planetary gears 31 which are rotatably supported on a plurality of planetary shafts 30 extending between the first and second carrier parts 28A and 28B and are engaged with the internal teeth 24, a sun gear 33 which is formed on an outer circumferential surface of a pinion shaft 32 passing through the first carrier part 28A and extending along a direction of a device axial line 20a and is engaged with the planetary gears 31, and an output shaft 34 formed on the second carrier part 28B integrally and extending along the direction of the device axial line 20a.

The front planetary gear mechanism 22 has a circular internal gear 35 fixed on a circular end surface 28a of the first carrier part 28A at the rear side, a plurality of planetary gears 36 engaged with internal teeth 35a formed on an inner circumferential surface of the internal gear 35, and a sun gear 39 which is formed on an outer circumferential surface of a pinion shaft 38 extending along the direction of the device axial line 20a and is engaged with the planetary gears 36. The carrier 37 is connected with the pinion shaft 32 at the rear-stage side.

Unitary structure of the carrier 29 at the rear-stage side and the output shaft 34

Figure 6:
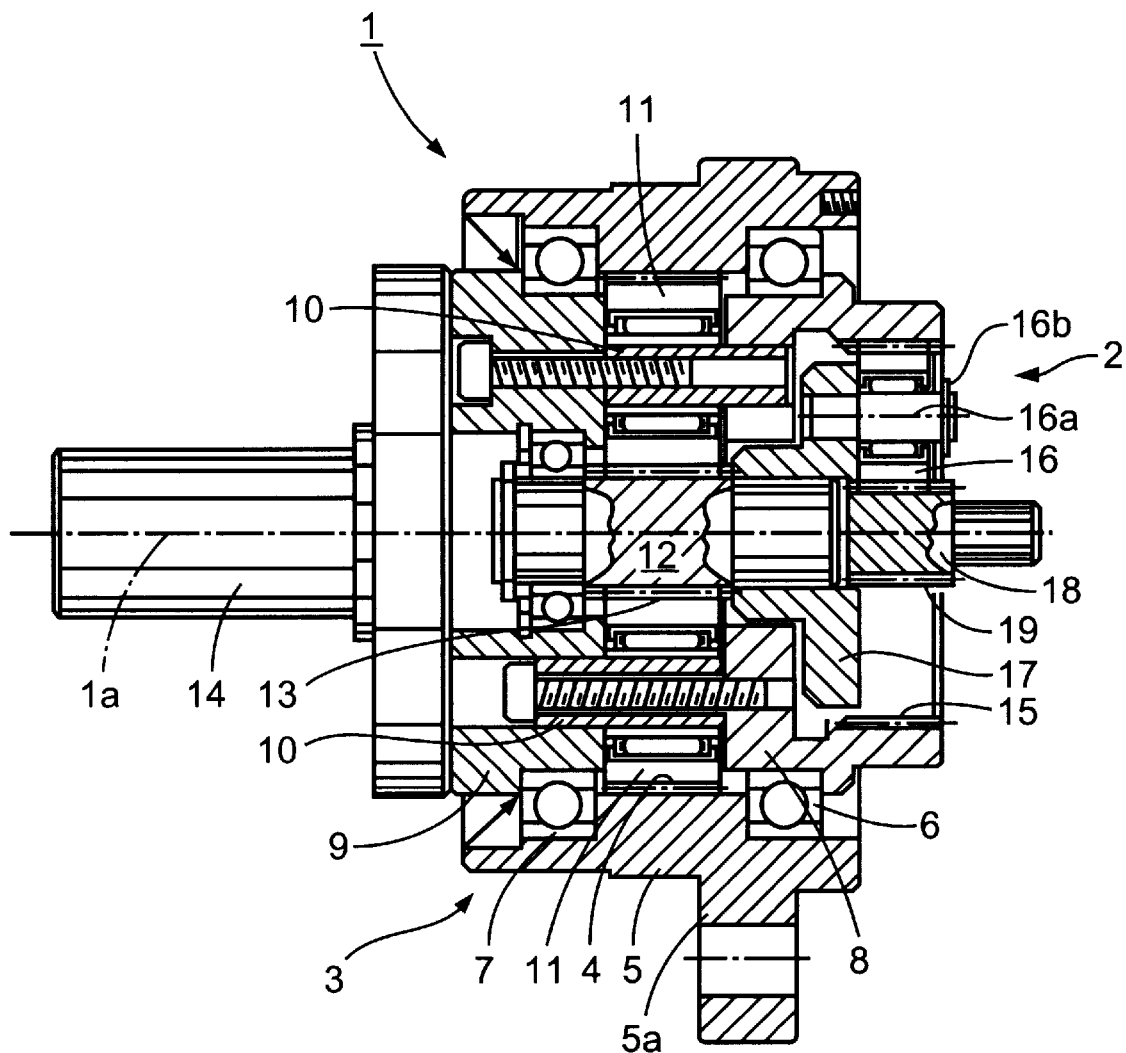
FIG. 6 is a schematic sectional diagram of a conventional two-stage planetary gear device.

As mentioned above, the carrier 29 at the rear-stage side is constituted such that a pair of carriers 8 and 9 on both sides as shown in FIG. 6 in the prior art is unified. Further, the thus unified carrier 29 and the output shaft 34 are unified as a unitary member. A plurality of planetary shafts 30 are driving pins which are driven and fixed into the carrier parts 28A and 28B located on both sides of the internal teeth 24.

Thus, the carrier 29 is formed as a unitary member, and the carrier 29 and the output shaft 34 are also formed as the unitary member. In comparison with the case where these parts are fastened to integrate with fastening bolts or other means, the number of component parts can be reduced. Further, assembly processes can also be reduced. Furthermore, such an advantage is obtained that there is no need to worry about assembly accuracy of these parts. In addition, since the driving pins are used as the planetary shafts 30, compared with the conventional structure where the planetary shafts are fixed with bolts, the number of component parts and assembly processes can be reduced, and assembly accuracy can also be enhanced.

Supporting structure of the carrier at the front-stage side and the pinion shaft at the rear-stage side)

Next, an integrated member, which is comprised by the carrier 37 at the front-stage side and the pinion shaft 32 at the rear-stage side fixed on one end of the carrier 37, has one axial end surface, that is, an axial end surface 32a of the pinion shaft 32 which is supported by a steel ball, and the other axial end surface 32c at the opposite side which is supported in a sliding contact state.

In the shown example, the carrier 29 has a circular end surface 29a facing to the axial end surface 32a of the pinion shaft 32, and a groove 29b extending along the axial line 20a is formed on the circular end surface 29a in which a steel ball 29c is accommodated. The axial end surface 32a of the pinion shaft is formed with a groove having a conical-shaped inner circumferential surface 32b which can be in contact with the surface of the steel ball 29c. Thus, the axial end surface 32a of the pinion shaft 29 is supported by the steel ball 29c.

The axial end surface 32c at the opposite side is formed at its center with a circular projection 32d slightly projecting along the axial line direction. The projection 32d faces to the pinion shaft 38 at the front-stage side which is fixed of its axial position by means that it is connected with an external member (not shown).

Therefore, the integrated member which is constituted to have the carrier 37 at the front-stage side and the pinion shaft 32 at the rear-stage side fixed with each other, is slidable within a range defined by the steel ball 29c and the end surface 38a of the pinion shaft 38 at the front-stage side.

Accordingly, the rear-stage side pinion shaft 32 can be supported by the steel ball 29c and the front stage side pinion shaft 38 at its axial end surfaces on both sides where relative sliding speed is low, namely at the center side portions of the axial end surfaces. Therefore, without using ball bearings, the integrated member can be rotatably supported while maintaining the slide resistance due to the rotation thereof to be reduced. Hence, it is possible to constitute an inexpensive shaft supporting mechanism as like as the ball bearing.

Further, the integrated member is in a floating condition movable along the axial line direction. Thus, a load transferred through the integrated member can be distributed in an appropriate manner, improving toque transfer property.

Main guide bearing pre-pressure mechanism

Figure 2:
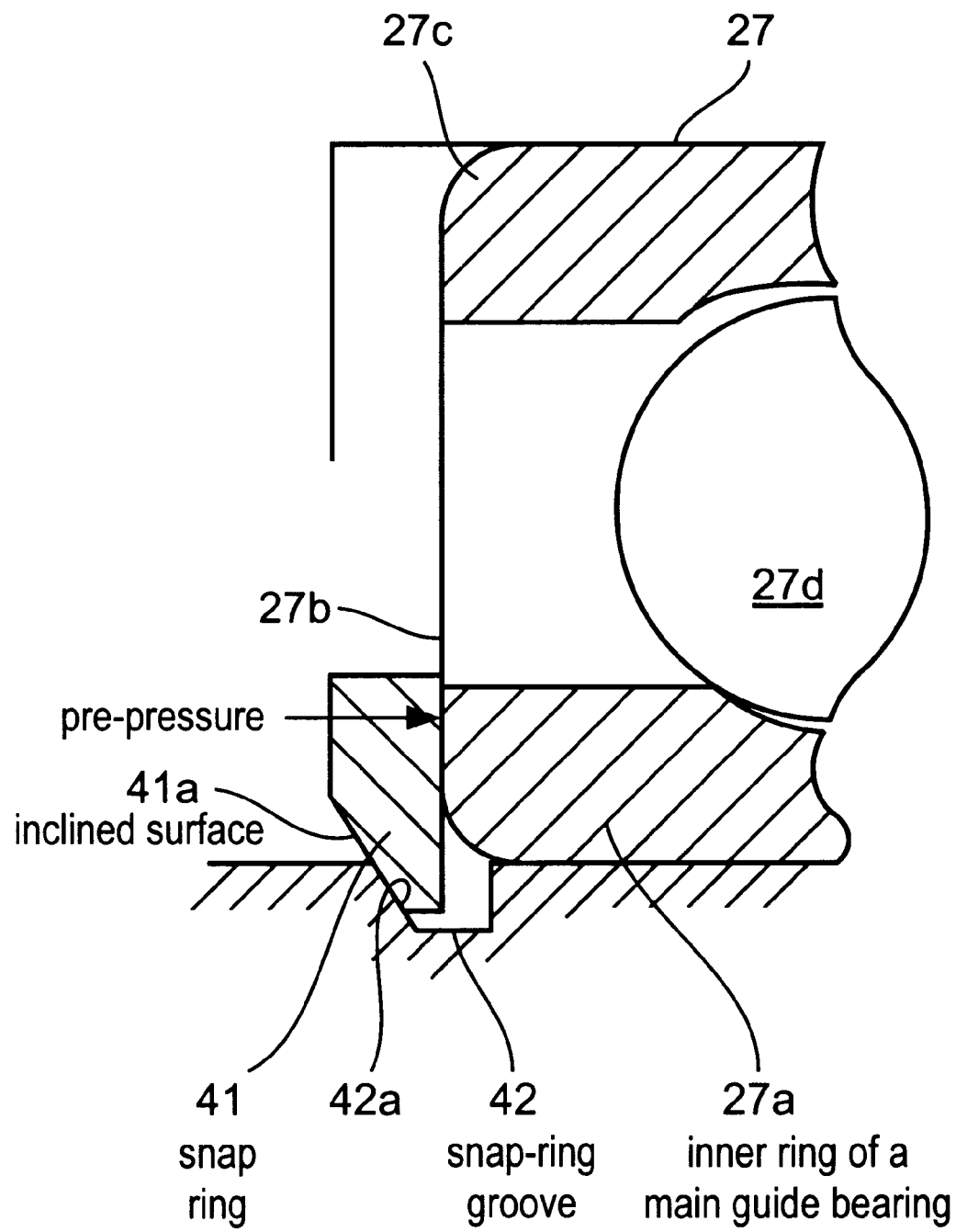
FIG. 2 is an enlarged partial view of an encircled area in FIG. 1e, showing a pre-pressure mechanism for main guide bearings.

In the shown planetary gear device 20, a pre-pressure is applied to the main guide bearing 27 as follows. Namely, as shown in an enlarged scale in FIG. 2, a snap ring 41 is provided on a circular end surface 27b of an inner ring 27a of the main guide bearing 27. This snap ring 41 has an end surface abutting against the inner ring 27a which is a flat circular end surface. While a circular end surface at the opposite side thereof is formed at its inner side with a circular inclined surface portion 41a.

The snap ring 41 is fixed into a snap-ring groove 42 which is formed on an outer circumferential surface of the rear-stage side carrier 29. The snap-ring groove 42 is formed with a circular inclined surface 42a corresponding to the circular inclined surface portion 41a of the snap ring 41. When the snap ring 41 is expanded and inserted into the snap-ring groove, it is elastically deformed toward a radially inner side direction to its initial shape. As a result, the inclined surfaces 41a and 42a cooperate to exert a wedge effect, whereby a pressing force is generated for pressing the inner ring 27a in the axial line direction.

In the shown example, the snap ring having the inclined surface portion is used to apply a pre-pressure to the main guide bearing. Therefore, it is possible to realize a pre-pressure mechanism which is superior to the conventional pre-pressure mechanism using a bearing nut, shim, spring and other members in terms of manufacturing cost, workability and installation space.

Here, in the planetary gear device 20 of this example, a pair of main guide bearings 26 and 27 are applied on their outer rings 26c and 27c with a pre-pressure in the direction of the device axial line 20a to separate these rings from each other, while their inner rings 26a and 27a are applied with a pre-pressure in the direction of the device axial line 20a to make them come close to each other.

Namely, as shown in FIG. 1, circular spacers 43 and 44 are disposed on both sides of the internal gear 25. An end surface of the circular spacer 43 is in contact with the outer ring 26c of the main guide bearing 26, while an end surface of the circular spacer 44 at the opposite side is in contact with the outer ring 27c of the main guide bearing at the other side.

The inner ring 26a of the main guide bearing 26 has an outer side end surface which is in contact with a circular inner-ring engagement portion 29d. The inner ring 27a of the main guide bearing 27 at the opposite side is applied with a pre-pressure by the snap ring 41 as mentioned above.

As a result, a pair of the main guide bearings 26 and 27 are in such a condition at the side of the inner rings 26a and 27a that they are held between the inner-ring engagement portion 29d and the snap ring 41 and are applied with a pre-pressure in the direction that they come close to each other along the axial line direction 20a. On the other hand, the side of the outer rings 26c and 27c of a pair of the main guide bearings 26 and 27 are pressed against the spacers 43 and 44, respectively, so that they are in a condition that they are applied with a pre-pressure in the direction that they are separated from each other along the axial line direction 20a.

Thus, the span L1 of bearing point of application becomes larger than the actual span L between the bearings. Therefore, for example, when an external force F is applied on the end side of the output shaft 34 to produce a bending moment, stress occurred in the shaft becomes small since the span L1 of bearing point of application. As a result, even if an external moment is applied, an adverse effect on the properties of the reduction device can be suppressed.

Removal prevention structure of the planetary gears

Figure 3:
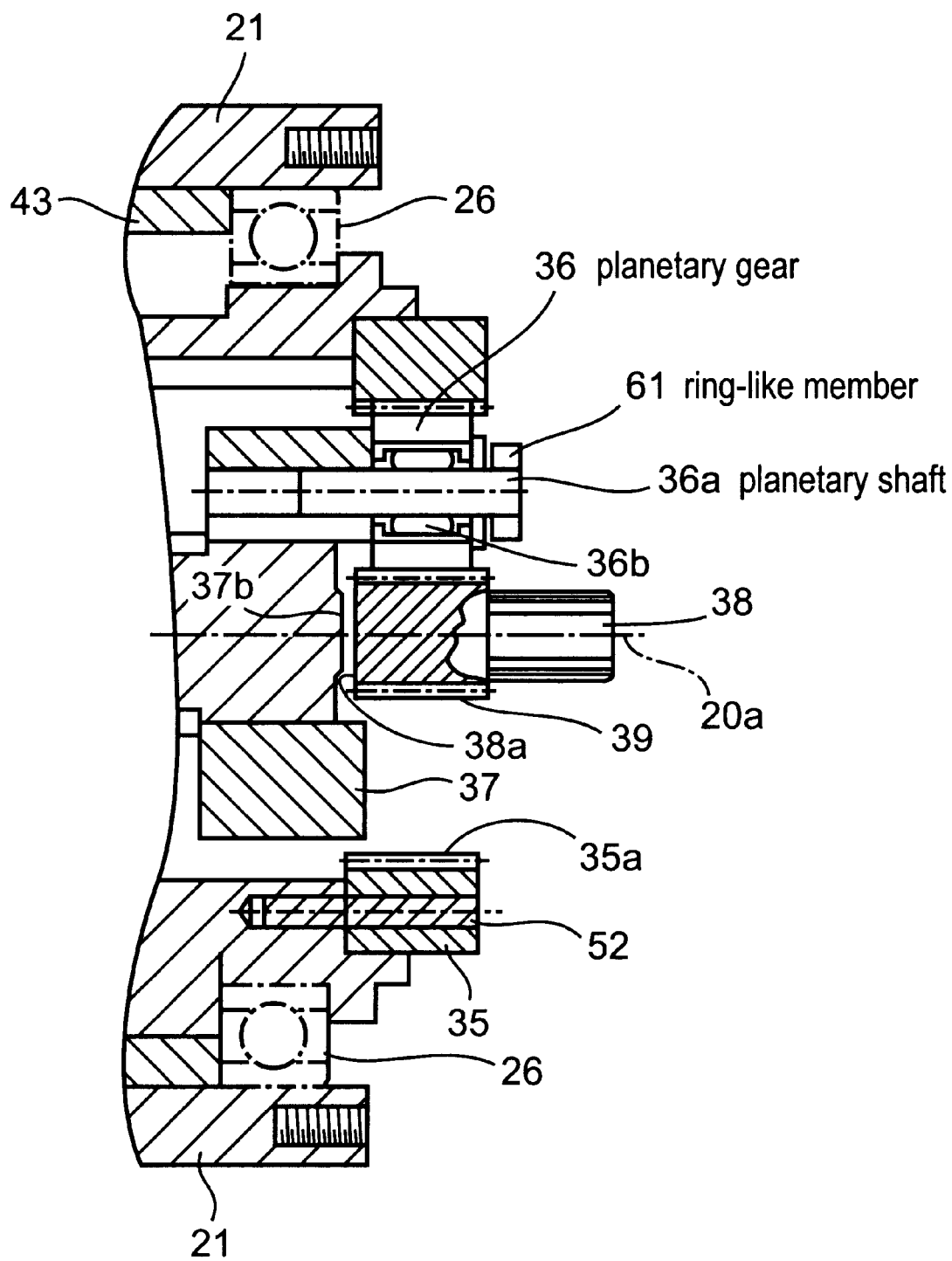
FIG. 3 is an explanatory view of a front-stage side planetary gear mechanism of FIG. 1, showing a removal prevention mechanism of the planetary gear.

With reference to FIG. 3, there will be explained a removal prevention structure of the front-stage side planetary gears 36. As shown in this figure, a plurality of the planetary shafts 36a are projected in a cantilevered state along the direction of the device axial line 20a from an end surface of the carrier 37. On each planetary shaft 36a, the planetary gear 36 is rotatably supported via a roller bearing 36b. The planetary gear 36 may be moved toward the end side of the planetary shaft 36 and removed therefrom. In order to prevent removal thereof, conventionally as shown in FIG. 6, such a removal prevention structure is adopted that the planetary shaft is formed at its end with a snap-ring groove in which a snap ring is fixed.

In this example, a ring-like member 61 for preventing removal is press fitted on the end of the planetary shaft 36a so as to form tight-fitting bond, When this structure is adopted, there is no need to form the snap-ring groove on the end of the planetary shaft which is required when the snap ring is used. In addition, it can easily be confirmed by a look whether or not the press fitting condition of the ring-like member 61 is appropriate.

Structure of sliding portions of the planetary gear and the carrier

Here, in a planetary gear device such as the shown planetary gear device 20, a washer or the like is generally inserted in a sliding portion between the planetary gear and the carrier so as to reduce sliding resistance between them. As a structure to reduce the sliding resistance of the sliding portion, it is desirable to employ the following one in the consideration of reduction in number of the component parts and assembly workability.

Figure 4A:
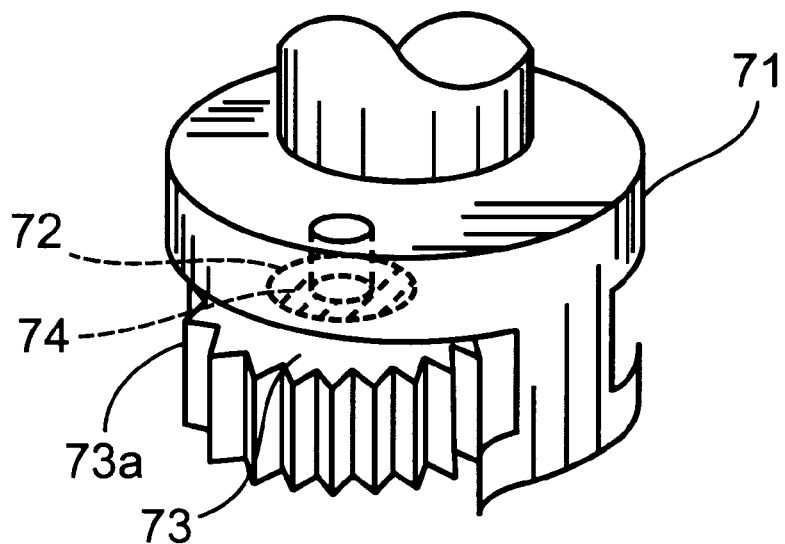
FIG. 4 is an explanatory view showing a mechanism for reducing a sliding resistance between the planetary gear and the carrier.
Figure 4B:
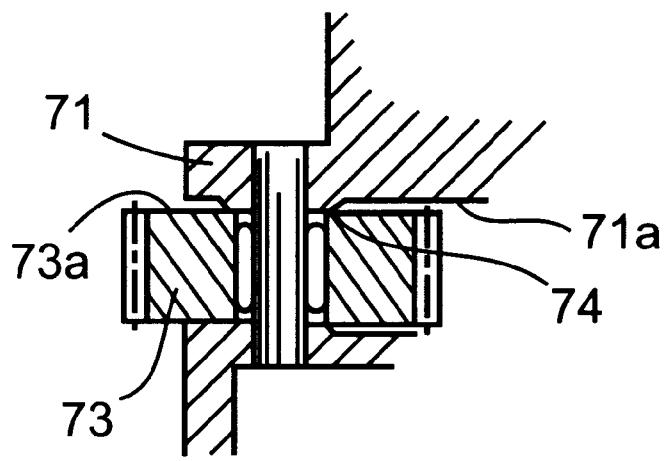

Explanation is made with reference to FIG. 4. In a planetary gear device, a planetary gear 73 is supported by a planetary shaft 72 attached on a carrier 71. Therefore, there is formed a sliding condition between an end surface 71a of the carrier 71 and an end surface 73a of the planetary gear facing thereto. In order to reduce the sliding resistance of this portion, the carrier end surface 71a is formed with a bearing surface 74 raised circularly therefrom, for example. With the bearing surface 74 formed, sliding area is reduced. Further, the sliding portion is located near the center of rotation of the planetary gear and has a low sliding resistance. Accordingly, with the bearing surface 74 formed, the sliding resistance between the carrier end surface and the planetary-gear end surface can be reduced without assembling another members such as a washer and the like.

Instead of forming the bearing surface 74 at the side of the carrier end surface 71a, the end surface 73a of the planetary gear 73 may be formed with a similar bearing surface.

Fixing structure of the internal gear

Next, in the shown planetary gear device 20, the rear-stage side internal gear 25 is fixed inside the device housing 21. More specifically, the device housing 21 is formed on its inner circumferential surface with a circular end surface 21b, against which the end surface of the circular spacer 44 as mentioned before is pressed. The internal gear 25 is pressed against the other end surface of the spacer 44. In this condition, knock pins 51 are pressed into so as to form tight-fitting bond, which extends from the side of the internal gear 25 to the device housing 21 passing through the spacer 44. Instead of the knock pins, spring pins can also be used.

Likewise, the front-stage side internal gear 35 is also fixed on the end surface of the rear-stage side carrier 29 with knock pins 52 which are pressed thereinto from the end-surface side of the internal gear 35 so as to form tight-fitting bond. In this case also, spring pins may be used instead of the knock pins.

As mentioned above, in the shown planetary gear device 20, the internal gears 25 and 35 which are manufactured independent from the device housing 21 or the carrier 29 are fixed by means of the knock pins or spring pins without using the fastening means such as fastening screws which is commonly used in the past. Where the fastening screws are employed, tapping is required and fastening torque must be controlled. However, where the knock pins or spring pins are pressed into so as to form tight-fitting bond, tapping or control of fastening torque becomes unnecessary. Further, the knock pins are less expensive than the fastening screws. Accordingly, it is possible to realize a fixing structure of the internal gear which is simple and inexpensive.

Figure 5:
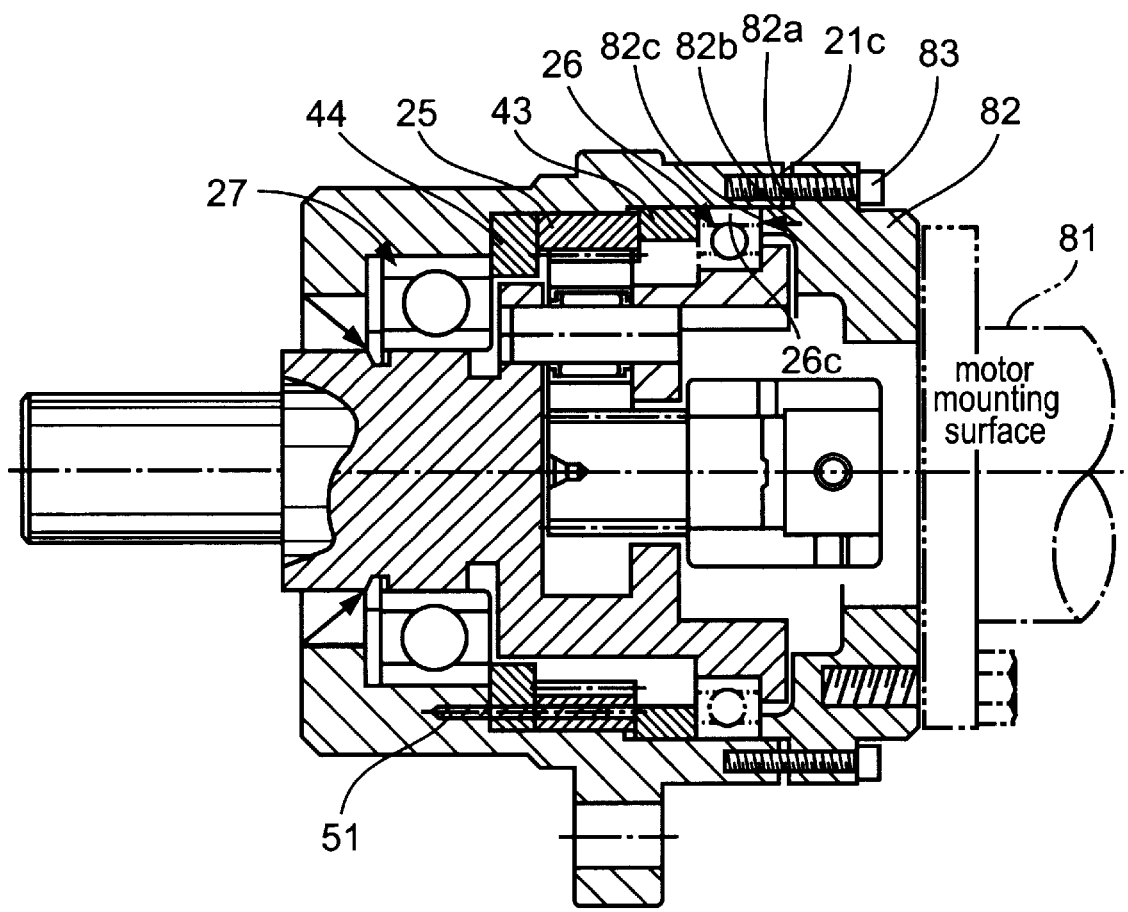
FIG. 5 is an explanatory view showing a mechanism for making use of an adapter flange to fix the internal gear to the device housing.

Next, FIG. 5 shows another example of the fixing mechanism of the rear-stage side internal gear 25. With reference to this drawing, the planetary gear device 20 is sometimes used as a motor gear head. Thus, an adapter flange 82 is assembled between the planetary gear device 20 and a motor 81. The adapter flange 82 is fixed on the end surface 21c of the device housing 21 with fastening bolts 83.

A circular projection 82b extending toward the direction of device axial line 20a is formed on an inner circumferential side of a circular end surface 82a of the adapter flange 82 which is in contact with the end surface 21c of the device housing 21. The circular projection 82b has a circular end surface 82c at its end which comes in contact with the end surface of the outer ring 26c of the main guide bearing 26.

Therefore, when the adapter flange 82 is fixed on the device housing 21, the outer ring 26c of the main guide bearing 26 is pressed along the direction of the device axial line 20a. The pressing force is transferred to the internal gear 25 via the spacer 43. The end of the internal gear 25 at the opposite side is supported on the side of the device housing 21 via the spacer 44. As a result, by fixing the adapter flange on the device housing 21, the internal gear 25 is also pressed against and fixed on the device housing 21.

Thus, in the planetary gear device 20 as shown in FIG. 5, when the adapter flange 82 is fixed, the internal gear 25 is pressed against the device housing 21 by the fastening force. Since the internal gear 25 is fixed on the device housing 21 by the knock pins 51, it is possible to form a state in which the internal gear 25 is fixed on the side of the device housing 21 more securely with the pressing force by the adapter flange 82.

The fastening force of the fastening bolts is increased, so that the pressing force of the circular end surface 82c of the adapter flange 82 can be increased. For example, the side of the fastening bolts is ranked up, or the number of the fastening bolts is increased, so that the pressing force can be increased. When the pressing force becomes large, the internal gear 25 can be fixed on the side of the device housing 21 even without using the knock pins or the like. In this case, the fixing mechanism of the internal gear 25 and the device housing 21 can be more simplified, and no space is required for the knock pins or the like.

INDUSTRIAL APPLICABILITY (1) According to the planetary gear device of this invention, the first and second carriers and the output shaft are formed as a unitary member. Further, the driving pins are used as the planetary shafts which are driven so as to extend between the first and second carrier parts. Therefore, in comparison with the case where the first and second carriers and the output shaft are formed as separate members, and where the planetary shafts are fixed on the carrier with fastening screws, the number of component parts and manufacturing cost can be reduced, and at the same time the assembly processes can be reduced and assembly accuracy can be enhanced.

(2) According to the planetary gear device of this invention, when the front-stage side carrier is coaxially fixed on the pinion shaft to constitute the front-stage side planetary gear mechanism, the center portion of at least one of the axial end surfaces of the pinion shaft is constituted to be supported in a sliding contact state. For example, such a constitution is employed that the axial end surface is supported by a ball member such as a steel ball which is disposed at a position adjacent thereto in the direction of the device axial line. Therefore, there is no need to use bearing means such as a ball bearing to support the pinion shaft, so that the structure of the bearing portion can be simplified and the manufacturing cost thereof can also be reduced.

(3) According to the planetary gear device of this invention, there are provided the snap ring having the circular end surface formed with the circular inclined surface portion and the snap-ring groove having a circular inclined surface corresponding to said circular inclined surface portion which is formed on a position where the circular end surface of at least one of the inner and outer rings of the main guide bearing is faced, wherein the snap ring is inserted into the snap-ring groove to apply the pre-pressure on the main guide bearing. Therefore, a bearing pre-pressure means can be realized that is inexpensive, has good workability and can be assembled even in a narrow space.

(4) According to the planetary gear device of this invention, the outer rings of the main guide bearings are applied with a pre-pressure to separate them from each other along the device axial line direction, while the inner rings thereof are applied with a pre-pressure to make them come close to each other along the device axial line direction. Therefore, the span of point of application between the main guide bearings can be made long, whereby when a bending moment is produced in the device by an external load, occurrence of a large inner stress can be avoided.

(5) According to the planetary gear device of this invention, where the front-stage planetary gears are rotatably supported on the front-stage side planetary shafts attached in a cantilevered condition on the front-stage side carrier to constitute the front-stage side planetary gear mechanism, a removal prevention ring-like member is pressed into and fixed in a tight-fitting condition on the end of the front-stage side planetary shaft. Therefore, comparing with the case where the snap ring is used as the removal prevention mechanism, there is obtain an advantage that part processing operation is not required.

(6) In the planetary gear device according to this invention, the internal gear is fixed on the device housing by using the knock pins or spring pins which are tightly fitted. Therefore, in comparison with the case where the fastening screws and the like are used, it is possible to realize a fixing mechanism which has less number of component parts and has better workability.

(7) According to the planetary gear device of this invention wherein the adapter flange for mounting a motor is fixed on the one axial end surface of the device housing, the adapter flange is formed with a projection which is able to press the internal gear against the device housing in the device axial line direction and fix it thereto. With this configuration, a mechanism for fixing the internal gear on the device housing can be simplified and its assembling operation can also be simplified.

(8) In the planetary gear device according to this invention, between the circular end surface of the planetary gear and the sliding surface at the side of the carrier on which the circular end surface slides, there is provided a bearing surface formed by raising one side of these portions circularly toward the other side. With this configuration, the same effects can be obtained with a simpler structure as those obtained by the case where a washer or the like is used to reduce the sliding resistance.

What is claimed is:

1. A planetary gear device which has an internal gear, a pair of main guide bearing disposed on both sides of the internal gear, first and second carriers rotatably supported by the main guide bearings, a plurality of planetary shafts extending between the first and second carriers, a plurality of planetary gears rotatably supported on the respective planetary gears and engaged with the internal gear, a pinion shaft passing through the first carrier coaxially to extend in a device axial line direction, a sun gear formed on an outer circumferential surface of the pinion shaft and engage with the planetary gears, and an output shaft connected to the second carrier and extending in the device axial line direction, wherein the first and second carriers and the output shaft are formed as a unitary member, and further comprising a front-stage side carrier of a front-stage side planetary gear mechanism fixed coaxially to the pinion shaft and a supporting means for supporting a center portion of at least one of axial end surfaces of the pinion shaft in a sliding contact state.

2. The planetary gear device according to claim 1, wherein the respective planetary shafts are driving pins which are driven so as to extend between the first and second carrier portions as the unitary member.

3. The planetary gear device according to claim 1, wherein the supporting means comprises a ball member disposed adjacent in the device axial direction to one of the axial end surfaces of the pinion shaft.

4. The planetary gear device according to claim 1, wherein front-stage side planetary gears are rotatably supported on front-stage side planetary shafts attached in a cantilevered state on a front-stage side carrier, and a removal prevention ring-like member is press fitted on an end of the front-stage side planetary gear shaft in a tight-fitting condition.

5. The planetary gear device according to claim 2, wherein front-stage side planetary gears are rotatably supported on front-stage side planetary shafts attached in a cantilevered state on a front-stage side carrier, and a removal prevention ring-like member is press fitted on an end of the front-stage side planetary gear shaft in a tight-fitting condition.

6. The planetary gear device according to claim 3, wherein front-stage side planetary gears are rotatably supported on front-stage side planetary shafts attached in a cantilevered state on a front-stage side carrier, and a removal prevention ring-like member is press fitted on an end of the front-stage side planetary gear shaft in a tight-fitting condition.

7. A planetary gear device which has an internal gear, a pair of main guide bearing disposed on both sides of the internal gear, first and second carriers rotatably supported by the main guide bearings, a plurality of planetary shafts extending between the first and second carriers, a plurality of planetary gears rotatably supported on the respective planetary gears and engage with the internal gear, a pinion shaft passing through the first carrier coaxially to extend in a device axial line direction, a sun gear formed on an outer circumferential surface of the pinion shaft and engaged with the planetary gears, and an output shaft connected to the second carrier and extending in the device axial line direction, wherein first and second carriers and the output shaft are formed as a unitary member, and further comprising a bearing pre-pressure means which apply at least one of inner and outer rings of the main guide bearing with a pre-pressure along the device axial line direction, wherein the bearing pre-pressure means comprises a snap ring formed on its circular end surface with a circular inclined surface portion, and a snap-ring groove having a circular inclined surface which corresponds to said circular inclined surface portion and is formed at a position facing to an circular end surface of at least one of the inner and outer rings of the main guide bearing, and wherein the snap ring is inserted and fixed into the snap-ring groove.

8. A planetary gear device which has an internal gear, a pair of main guide bearing disposed on both sides of the internal gear, first and second carriers rotatably supported by the main guide bearings, a plurality of planetary shafts extending between the first and second carriers, a plurality of planetary gears rotatably supported on the respective planetary gears and engage with the internal gear, a pinion shaft passing through the first carrier coaxially to extend in a device axial line direction, a sun gear formed on an outer circumferential surface of the pinion shaft and engaged with the planetary gears, and an output shaft connected to the second carrier and extending in the device axial line direction, wherein the first and second carriers and the output shaft are formed as a unitary member and the outer rings of the main guide bearings are applied with a pre-pressure to separate them from each other in the device axial line direction, and the inner rings of the main guide bearings are applied with a pre-pressure to make them come near to each other in the device axial line direction.

9. A planetary gear device which has an internal gear, a pair of main guide bearing disposed on both sides of the internal gear, first and second carriers rotatably supported by the main guide bearings, a plurality of planetary shafts extending between the first and second carriers, a plurality of planetary gears rotatably supported on the respective planetary gears and engage with the internal gear, a pinion shaft passing through the first carrier coaxially to extend in a device axial line direction, a sun gear formed on an outer circumferential surface of the pinion shaft and engaged with the planetary gears, and an output shaft connected to the second carrier and extending in the device axial line direction, wherein the first and second carriers and the output shaft are formed as a unitary member further comprising a device housing to which the internal gear is fixed and knock pins are pressed and tightly fitted into the internal gear and the device housing to form fixing thereof.

10. The planetary gear device according to claim 9, further comprising an adapter flange for mounting a motor fixed on one axial end surface of the device housing wherein the adapter flange has a projection which is able to press the internal gear against the device housing and fix it thereto, and wherein the projection fixes the internal gear to the side of the device housing with a pressing force exerted by a fixing force to fix the adapter flange on the device housing.

11. A planetary gear device which has an internal gear, a pair of main guide bearing disposed on both sides of the internal gear, first and second carriers rotatably supported by the main guide bearings, a plurality of planetary shafts extending between the first and second carriers, a plurality of planetary gears rotatably supported on the respective planetary gears and engage with the internal gear, a pinion shaft passing through the first carrier coaxially to extend in a device axial line direction, a sun gear formed on an outer circumferential surface of the pinion shaft and engaged with the planetary gears, and an output shaft connected to the second carrier and extending in the device axial line direction, wherein the first and second carriers and the output shaft are formed as a unitary member, and wherein between a circular end surface of the planetary gear and an end surface at the side of the first or second carrier on which the circular end surface slides, a bearing surface is provided which is formed by projecting one of the end surfaces to the other side.

* * * * *